Figure 1:
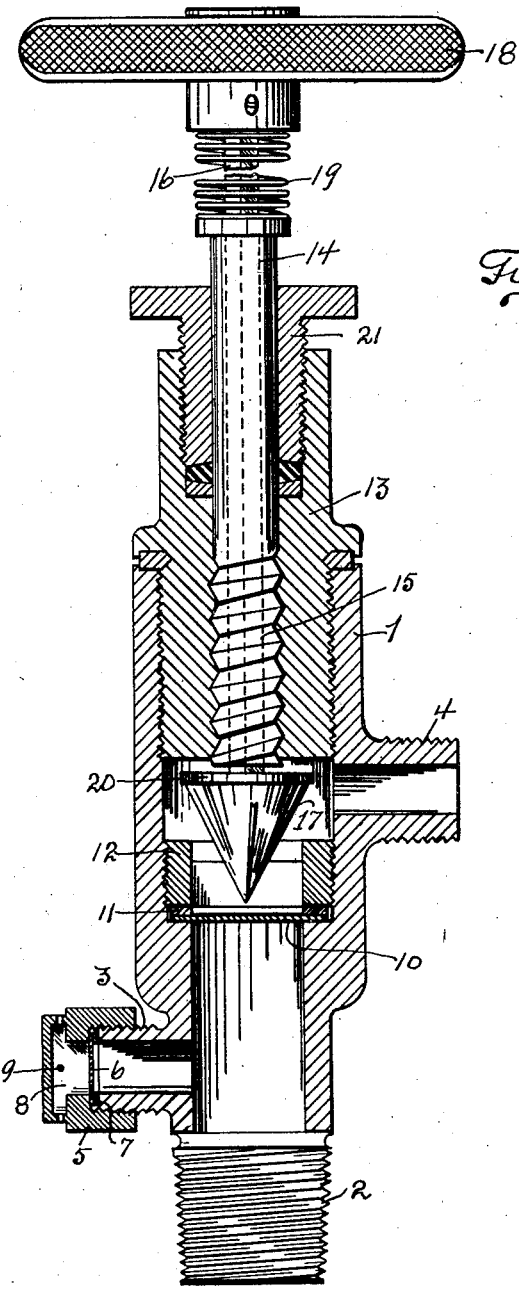

Sept. 27, 1932.  G. M. MARR ET AL.  1,879,382
VALVE
Filed April 10, 1929  2 Sheets-Sheet 1

INVENTOR
George M. Marr
BY
ATTORNEY

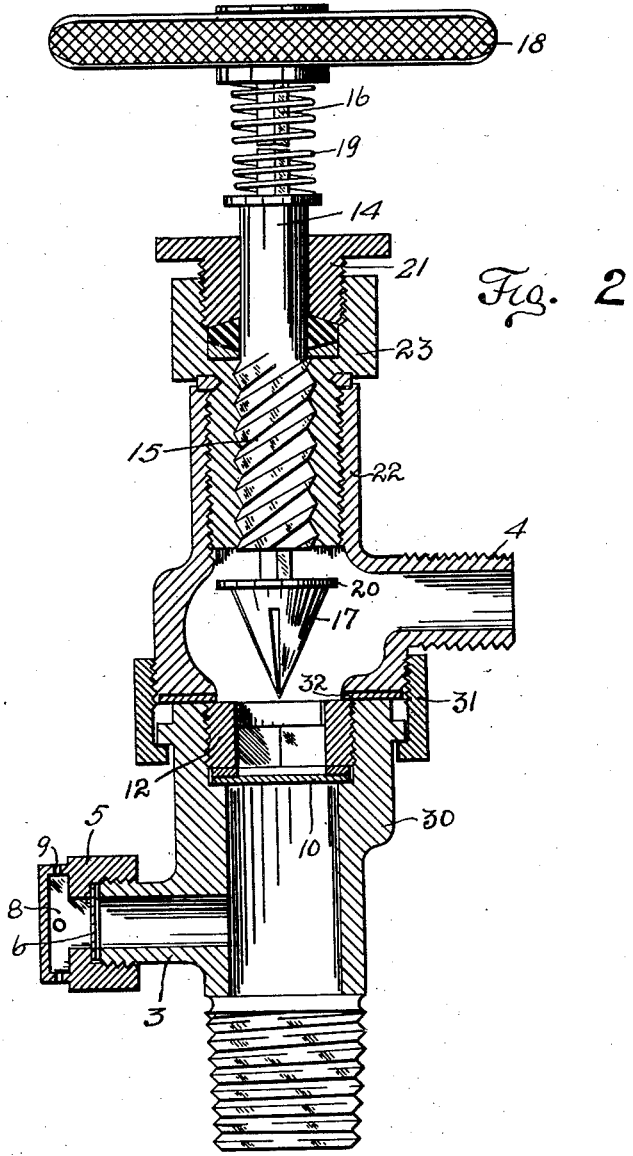

Patented Sept. 27, 1932

1,879,382

UNITED STATES PATENT OFFICE

GEORGE MATTHEW MARR, OF WOODHAVEN, AND ARTHUR PHELPS MARR, OF NEW YORK N. Y., ASSIGNORS TO WALTER KIDDE & COMPANY, INC., OF NEW YORK, N. Y., A CORPORATION OF NEW YORK

VALVE

Application filed April 10, 1929. Serial No. 354,155.

The device, the subject of this invention, is a valve intended to be used with cylinders or containers wherein is contained fluid or gas under pressure.

The principal objects of this invention are to provide a safety valve in combination with a frangible disk closure, and to so construct them that they will operate entirely independently and for this purpose the safety valve member will probably be of lighter weight or thinner material, so that the closure valve or frangible disk will not become ruptured under conditions that would rupture the safety valve disk.

As this device is intended to be used with containers for fluids under pressure, it is also desirable that means be provided so that the closure portion of the valve may be separated from the valve-operating mechanism, and so that the closure or disk bearing portions may be allowed to remain upon the tank or cylinder, and the valve member removed.

As this device is intended to operate with a frangible disk as the closing member, it is desirable that means be provided to rupture the disk.

We have provided such a means and have shown the means operable either by means of a screw pressure, or by means of a direct pressure, and we have also shown that the valve may be closed against the escape of fluid or gas after the normal closing disk has been ruptured, if it is desired to discontinue the fluid flow before the container is fully discharged.

Another object of our invention is to provide a means operating with a portion of our valve by which means the cylinder may be charged. That is, we show a means whereby a portion of our valve may be placed upon the cylinder, the cylinder charged, the sealing disks placed in position, and thereafter and at a later period, the valve operating mechanism be substituted for the filling mechanism.

Therefore the particular objects of this invention are to provide a frangible disk valve having an independent safety valve disk means for rupturing the frangible disk valve, either by direct pressure or screw pressure, and means for closing the valve after the disk has been ruptured. These and other advantages will be fully set forth as the specification progresses.

The following is what we consider the best means of carrying out this invention, and the accompanying drawings should be referred to for a complete understanding of the specification which follows.

In the drawings:—

Fig. 1 shows a valve of somewhat simple construction, and

Fig. 2 a complete exposition of our valve.

Both of these figures are in side elevation in section.

Similar reference numerals indicate like parts in all the figures where they appear.

At 1, we show a valve body having formed integral therewith, a screw threaded extension 2, by means of which the valve body is secured to the fluid container, and it will be noted that this screw thread 2 is tapered.

Formed integral, and projecting from the valve body, are a plurality of screw threaded bosses, as shown at 3 and 4, each having passages therethrough which connect with the interior of the valve body. To the boss 4, we will connect the line or pipe through which the fluid is to be discharged. Upon the boss 3, we will arrange a cap 5, the cap seating and retaining in place, a disk 6 of copper or other suitable material, the disk being packed by means of a washer 7, of fibre, or other desired material. The cap 5 is provided with a chamber 8 perforated as shown at 9, and these perforations open to the atmosphere. The thickness of the disk will be determined by the allowable pressure within the cylinder. Should the pressure increase to a dangerous point, the disk 6 will become ruptured, and the fluid or gas may escape through the perforations 9.

Seated within the body of the valve is the main disk shown at 10. This disk is also seated by means of a packing ring 11, and is retained in position by a screw threaded ring member 12.

In the upward extension and the body of the valve, we arrange a fitting 13, wherein is screw threaded, a valve steam 14. We prefer that the valve stem screw thread 15 should be rather steep, or a multiple thread.

The valve stem 14 is provided with a squared perforation therethrough, and passing through this squared perforation, is a squared rod 16. On the end of the rod, we arrange a tapered fluted member 17, and at the other end of the rod, the hand wheel 18. Between the valve stem 14 and the hand wheel 18, will be found a spring 19.

The rupturing member, or tapered member 17, is provided with a projection 20, which is adapted to be forced backward against the lower end of the valve stem 14, by the spring 19, to prevent leakage through the squared perforation through which the member 16 passes, and a suitable packing box gland 21 is shown surrounding the valve stem 14.

In the device shown in Fig. 2, the valve body is made in two parts, the part 22 containing the plug, or fitting 23, and into which the valve stem 14 is screw threaded, as shown at 15. It also supports the packing box or gland 21. In this structure, we also use the tapered and fluted member 17, the squared shaft 16, spring 19, and projection 20, as the general operation of both of these devices is the same. The discharging boss 4 is in this instance, formed with the upper body member 22. The boss 3 for the safety cap 5, is formed on the lower valve member 30. The sealing disk 10 and retaining ring 12 are a part of the lower valve member 30, and the lower member and the upper member are secured together by a slip ring 31, suitable packing as shown at 32 being introduced between these members.

In the operation of this valve, after the container is filled, the ring 12 and disk 10 are placed in position and are firmly secured, the disk 6 and its retaining ring having already been placed in position. When it is desired to discharge the content of the cylinder, the fluted and tapered member 17 is depressed, either by rotating the hand-wheel or by direct pressure thereon. The disk 10 will be punctured to the extent to which the member 17 is caused to pass therethrough, and thereupon the member 17 is withdrawn so that the cylinder may discharge. If now it is desired to stop the discharge, the hand-wheel 18 is turned, forcing the member 17 firmly down until the edges of the ring 12 close on the tapered portion of the member 17. These members will form an efficient valve.

While the structure shown in Fig. 2 has decided advantages, the general principle of operation is similar in both valves, and a cylinder or container fitted with the valve shown in Fig. 1, may be refilled by merely removing the fitting 13, and substituting a filling device, and of course it will be understood that modifications may be made within the scope of the appended claims without departing from the principle or sacrificing the advantages of this invention.

Having carefully and fully described our invention, what we claim and desire to secure by Letters Patent is:—

1. A frangible disk valve having a plurality of disks under constant pressure, mechanical means for rupturing one of said disks and a rotatable means for operating said mechanical rupturing means and a slidable means operable through said rotatable means for operating said rupturing means.

2. A valve having a plurality of frangible disks under constant pressure, means for rupturing one of said disks, said means comprising a rotatable means for operating said member and a compressible means for operating said member, both said means being adapted to operate independently or simultaneously with the other.

3. A valve having a valve body, provided with a passage therethrough, and a branch passage therefrom, a plurality of frangible disks of different diameters, one said disk being arranged in the said main passage and the other disk being arranged in the branch passage, both said disks being under constant pressure, and means for rupturing one said disk, said means comprising an exteriorly fluted cutter and a rotatable means, and a reciprocating means for causing said cutter to puncture said disk.

4. A valve having a valve body, provided with a passage therethrough, and a branch passage therefrom, a plurality of frangible disks of different diameters, one said disk being arranged in the said main passage and the other disk being arranged in the branch passage, both said disks being under constant pressure, and means for rupturing one said disk, said means comprising an exteriorly fluted cutter and a rotatable means, and a reciprocating means for causing said cutter to puncture said disk, both said operating means being operable independently or simultaneously, and a resilient means for returning the reciprocating means after each operation.

5. In a frangible disk valve comprising a valve body having a passage therethrough closed by a disk, means for rupturing the disk and reciprocable and rotatable means for operating the rupturing means whereby the rupturing means may be independently reciprocated or rotated to rupture the disk, or simultaneously reciprocated and rotated to rupture the disk.

6. A valve of the type described comprising a valve body having a passage therethrough closed by means of a disk, means for rupturing the disk, means for rotatively advancing said means to rupture the disk, and compressible means for longitudinally advancing said means to rupture the disk, both the rotatable means and the compressible means being operable independently or simultaneously.

7. A valve having a valve body provided with a passage therethrough closed by means of a disk, seat forming means for holding the disk in place, means for rupturing the disk and operable to engage said seat, and means for independently or simultaneously advancing said rupturing means rotationally or longitudinally and for causing it to engage said seat.

GEORGE MATTHEW MARR.
ARTHUR PHELPS MARR.